United States Patent [19]
Wiemer

[11] 3,848,726
[45] Nov. 19, 1974

[54] APPARATUS FOR TRANSFERRING PALLETS BETWEEN THE UPPER AND LOWER REACHES OF AN ENDLESS CONVEYOR SYSTEM

[75] Inventor: Erich Wiemer, Essen, Germany

[73] Assignee: Heinrich Koppers Gesellschaft mit beschrankter Haftung, Essen, Germany

[22] Filed: May 2, 1973

[21] Appl. No.: 356,573

[52] U.S. Cl.................. 198/108, 74/243 C, 266/21
[51] Int. Cl............................................ B65g 35/00
[58] Field of Search...... 198/108, 203, 137; 266/21, 266/74, 24 C

[56] References Cited
UNITED STATES PATENTS
2,798,592 7/1957 Uhrich............................... 198/203
2,853,288 9/1958 Hudson................................. 266/21

*Primary Examiner*—Richard E. Aegerter
*Attorney, Agent, or Firm*—Stanley J. Price, Jr.

[57] ABSTRACT

First and second endless chains rotate on support shafts mounted to a machine side frame at opposite ends of an endless conveyor system. The first and second endless chains are aligned between the upper and lower reaches of the conveyor system. Pallets propelled on rails travel on the upper reach from the feed end to the discharge end of the conveyor system. At the discharge end one of the endless chains engages the pallets supported by guide tracks for transfer to the lower reach. The pallets are then propelled in the guide tracks to the feed end. The second endless chain engages the pallets and thereby transfers the pallets from the lower reach to the upper reach. Both the endless chains include a plurality of articulated links connected by link rods. Rollers axially mounted on the link rods are arranged for rotation in a circumferential track around the support shafts. A drive sprocket imparts to one of the endless chains rotational movement which is transmitted to the second endless chain drivingly connected to the first endless chain. Each articulated link of the endless chains includes a tapered protuberance which projects radially outwardly from the articulated link. The protuberances are adapted to engage and disengage the rollers of adjacent pallets. Thus each pallet is transferred from one reach to the other reach at the feed and discharge ends as the endless chains revolve around the support shafts.

9 Claims, 5 Drawing Figures

3,848,726

APPARATUS FOR TRANSFERRING PALLETS BETWEEN THE UPPER AND LOWER REACHES OF AN ENDLESS CONVEYOR SYSTEM

BACKGROUND OF THE INVENTION

1. Field of the Invention

This invention relates to an apparatus for transferring a plurality of pallets between the upper and lower reaches of a conveyor system and more particularly to an apparatus for transferring each of the plurality of pallets in spaced relation between the upper and lower reaches of the conveyor system.

2. Description of the Prior Art

In the process of agglomerating granular particles of raw ores or heavy metallic concentrates by sintering, the granular particles are supplied at the feed end and deposited at the discharge end of a traveling endless grate or any other suitable conveyor system. The granular particles conveyed by the moving grate or transported in pallets propelled on rails pass beneath an ignition hood for roasting. Thereafter, the granular particles are discharged from the pallets at the discharge end of the conveyor system. At the feed end of the sintering machine driven lifting wheels transfer the pallets from the lower conveyor reach to the upper conveyor reach. Then at the discharge end the pallets are guided from the upper conveyor reach to the lower conveyor reach by lowering wheels. The lifting and lowering wheels include large gears which are expensive to manufacture and necessitate considerable time and further expense in repairing and replacing as a result of wear. There is need for an apparatus which efficiently transfers pallets being propelled on an endless conveyor system between the upper and lower conveyor reaches and is easily erected and economically maintained.

SUMMARY OF THE INVENTION

In accordance with the present invention, there is provided an apparatus for transferring a plurality of pallets between the upper and lower reaches of an endless conveyor system. A first endless engaging device is provided for transferring each of the pallets from the lower reach to the upper reach. A second endless engaging device positioned remote of the first endless engaging device transfers each of the pallets from the upper reach to the lower reach. Cylindrical support mechanisms are provided to maintain the first and second endless engaging devices aligned with the upper and lower reaches at opposite ends of the conveyor system to thereby permit the transfer of pallets between the respective reaches. The first and second endless engaging devices are arranged to revolve around the support mechanisms relative to the endless conveyor system. A drive means imparts rotational movement to at least one of the endless engaging devices at a preselected angular velocity. The first and second endless engaging devices are drivingly connected for rotational movement at the preselected angular velocity.

The first and second endless engaging devices include a plurality of articulated link members which are connected to form an endless chain reeved about the support mechanisms. Each of the link members are arranged on the surface of a corresponding support mechanism to revolve therearound at a preselected angular velocity. Link rods connect adjacent link members to form an endless chain reeved about the support mechanisms. Rollers are axially mounted to the link rods and are arranged for rotational movement on the cylindrical surface of the respective support mechanisms. Each link member of at least one of the endless chains is provided with a pin member positioned intermediate thereof and arranged to project horizontally outwardly from the link member. The drive means is operable to engage and disengage the pin member and thereby impart rotational movement to the link members. With this arrangement, the link members forming the endless chain revolve around the cylindrical surface of the support mechanisms at a preselected angular velocity.

Each link member of the first and second endless engaging mechanisms includes a tapered protuberance which projects radially outwardly from the link member. The tapered protuberances are arranged to engage in meshing relation the rollers of adjacent pallets propelled on the upper and lower reaches of the conveyor system. As the plurality of link members forming the first and second endless engaging devices revolve around the support mechanisms, the tapered protuberances move in and out of meshing relation with adjacent pallet rollers to transfer the pallets in spaced relation from one reach to the other reach at both the feed and discharge ends. Thus the pallets are propelled continuously on the conveyor system between the upper and lower reaches thereof.

Accordingly, the principal object of this invention is to provide an apparatus for transferring a plurality of pallets between the upper and lower reaches at the feed and discharge end of an endless conveyor system.

Another object of this invention is to provide an apparatus for transferring a plurality of pallets in spaced relation between the upper and lower reaches of an endless conveyor system.

Another object of this invention is to provide an apparatus for transferring pallets between the upper and lower reaches of an endless conveyor system in which the apparatus is compact in size permitting efficient and economical repair and replacement of the component parts.

A further object of this invention is to provide an apparatus for propelling a plurality of pallets along the upper and lower reaches between the feed and discharge end of an endless conveyor system.

These and other objects of this invention will be more completely described and disclosed in the following specification, the accompanying drawings and the appended claims.

DESCRIPTION OF THE PREFERRED EMBODIMENTS

Figure 1:
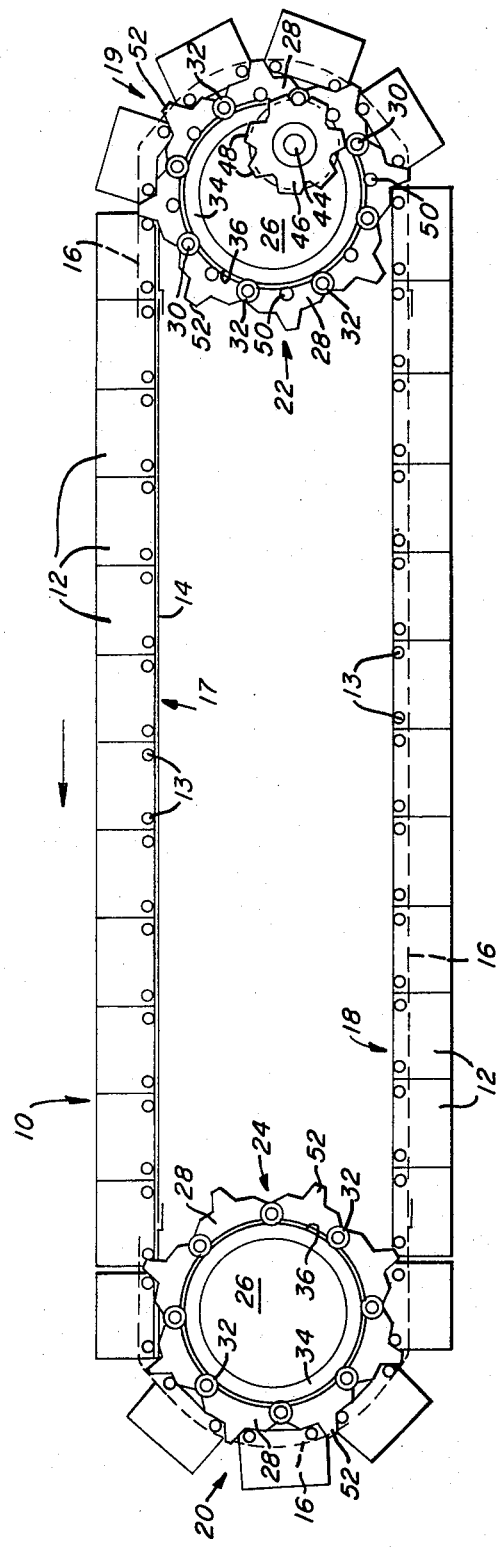
FIG. 1 is a view in side elevation of a plurality of pallets propelled on the upper and lower reaches of an endless conveyor system by a pair of driven endless chains in a continuous path between the feed and discharge ends of a sintering machine.

Referring to the drawings and particularly FIG. 1, there is illustrated an apparatus for moving pallets through a sintering machine generally designated by the numeral 10. A plurality of pallets 12 having rollers 13 are arranged to travel on rails 14 and in guide tracks 16 through a conventional sintering machine. The rails 14 and guide tracks 16 form the upper reach 17 and the lower reach 18 respectively of an endless conveyor system for the continuous transportation of pallets 12 from the feed end 19 to the discharge end 20 and back to the feed end 19. Granular particles of raw ores or concentrates are discharged from a feed drum (not shown) of the sintering machine into the pallets 12 at the feed end 19. The pallets 12 supported by the rollers 13 are propelled horizontally on the upper reach 17 comprising the rails 14 in the direction indicated by the arrow to thereby transport the granular particles from the feed end 19 to the discharge end 20. At the discharge end 20 the granular particles are deposited from the pallets 12 for further completion of the sintering processing. As the pallets 12 are transferred from the upper reach 17 to the lower reach 18, by means to be described hereinbelow, the rollers 13 are supported by the guide tracks 16, indicated by the dashed lines in FIG. 1. The guide tracks 16 are aligned with the rails 14 to thereby provide continuous transportation of the pallets 12 from the feed end 19 to the discharge end 20 and back to the feed end 19.

Endless chains 22 and 24 are reeved about the cylindrical support shafts 26 which are suitably journaled in the machine side frame at the feed end 19 and the discharge end 20 respectively of the sintering machine. The support shafts 26 provided at the feed end 19 and the discharge end 20 are drivingly connected by the pallets 12 to provide synchronized rotation of the endless chains 22 and 24 at the same preselected angular velocity. The support shafts 26 are movable horizontally in the machine side frame to compensate for variation in the length of the pallet chain attributed to thermal expansion and wear thereof.

Figure 2:
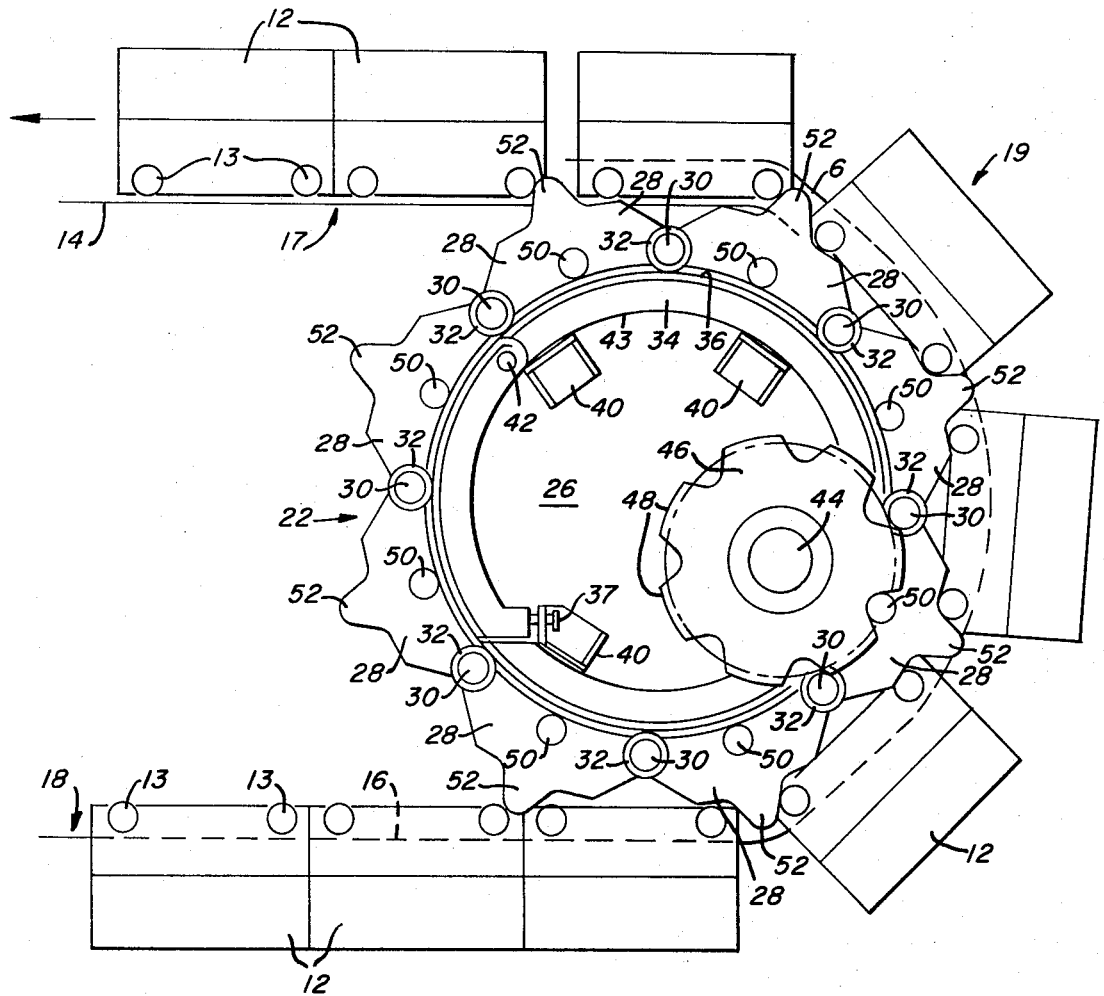
FIG. 2 is an enlarged fragmentary view in side elevation of the driven endless chain mounted on a support shaft at the feed end.

Referring to FIG. 2, there is illustrated an enlarged view of the feed end 19 in which the endless chain 22 includes a plurality of articulated links 28. Each of the articulated links 28 are connected to adjacent links 28 by a link rod 30 which passes through aligned bores or slots (not shown) provided in each link 28 at opposite ends thereof adjacent the support shaft 26. The endless chain 22 thus formed is reeved about the support shaft 26 for rotational movement relative thereto. Link rollers 32 are axially mounted on the link rods 30. The rollers 32 are supported on the link rods 30 to revolve in the circumferential track 36 of the support ring 34 around the periphery of the support shaft 26. The support ring 34 is rigidly secured to the support shaft 26 to thus permit rotation of the endless chain 22 around the support shaft 26. The rollers 32 are maintained in the circumferential track 36 as the endless chain 22 revolves around the support shaft 26.

The support ring 34 includes a fastening device, such as the set screw 37 threadably engaging the ring segment 38 to the ring retaining member 40. The ring segment 38 is suitably secured by the pivotal connection 42 to the support ring 34. By adjusting the set screw 37, the ring segment 38 may be suitably positioned relative the support ring 34 to thereby maintain the desired adjacency of the endless chain 22 for rotation around the support shaft 26. Thus adjustments to the ring segment 38 by the set screw 37 provides positive contact of the link rollers 32 on the circumferential track 36. Also with this arrangement, the endless chain 22 may be removed from position on the support shaft 26 for replacement of worn links 28 by disengaging the set screw 37 from the ring segment 38.

The support ring retaining members 40 are mounted at spaced intervals adjacent the periphery of the support shaft 26 in abutting contact with the inner circumferential edge 43 of the support ring 34. The support ring retaining members 40 frictionally engage the support ring edge 43 so that the support ring 34 remains fixed relative the support shaft 26. Thus the link rollers 32 of the chain links 28 are maintained in abutting contact with the circumferential track 36 for rotation therein. Referring to the embodiment of the invention illustrated in FIG. 3, the discharge end 20 includes a substantial number of parts which are the same and identically numbered as those for the feed end 19, illustrated in FIG. 2 and described hereinabove. Therefore, description of the identical parts will not be repeated.

In the preferred practice of this invention, axial rotation at a preselected angular velocity is imparted to a drive shaft 44 illustrated in FIG. 2, by a suitable prime mover. The drive shaft 44 nonrotatably supports a pair of drive sprockets 46 (only one of which is shown) for rotation therewith at the same angular velocity. The drive sprocket 46 includes a plurality of teeth 48 arranged at the periphery thereof to engage the link rods 30 of the chain links 28. Each of the chain links 28 is provided with a pin 50 positioned intermediate of the link adjacent the circumferential track 36. Each pin 50 projects horizontally outwardly from the chain links 28 and is arranged for engagement with the teeth 48 of the drive sprocket 46. Thus the endless chain 22 is driven at a uniform angular velocity around the support shaft 26 by engagement of the sprocket teeth 48 with the link rods 30 and the pins 50 of the chain links 28. Engagement of the sprocket teeth 48 with the pins 50 eliminates the need for a larger diameter drive sprocket to simultaneously engage two link rods and thereby maintain rotation of the endless chain at a uniform angular velocity.

Figure 3:
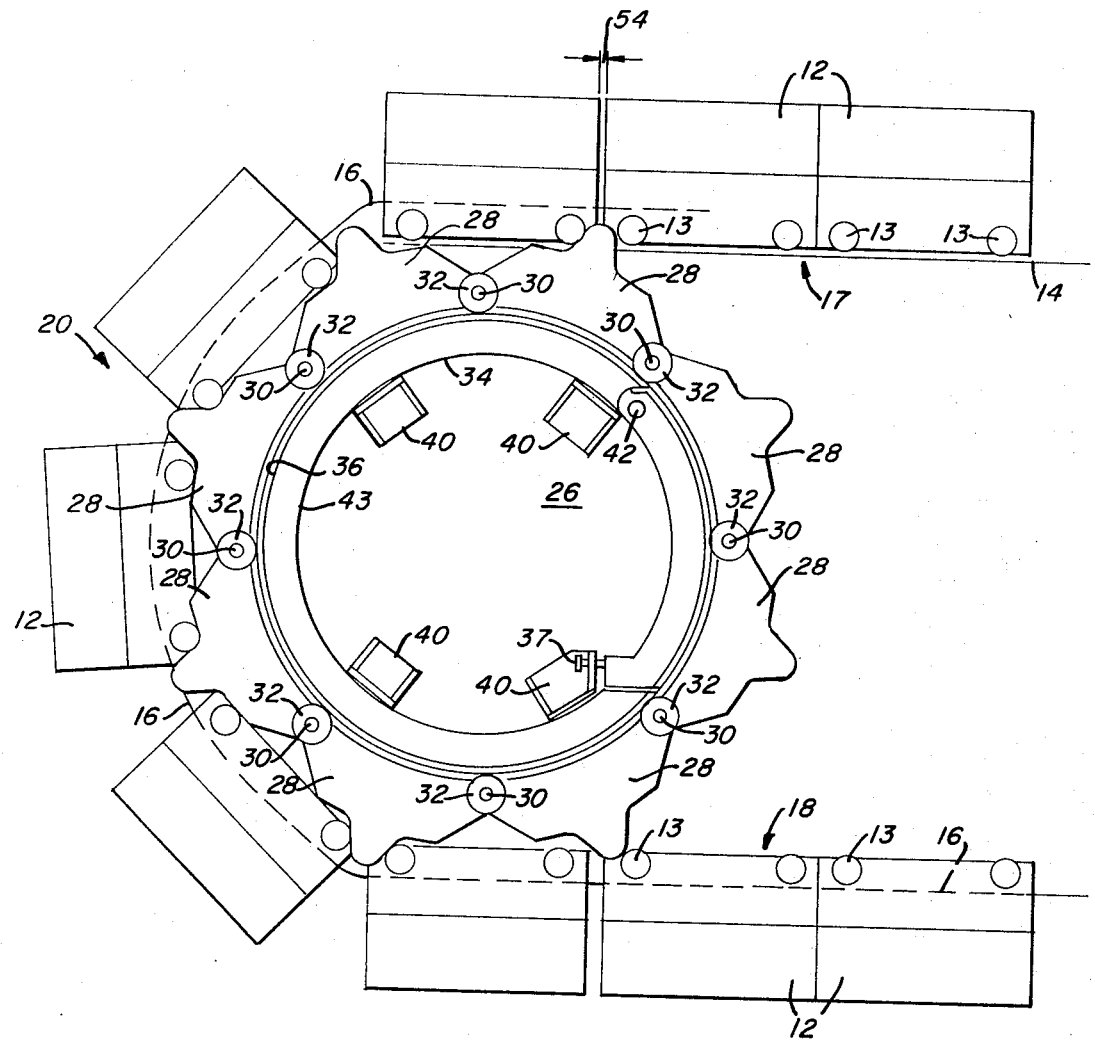
FIG. 3 is an enlarged fragmentary view in side elevation of the endless chain mounted on a support shaft at the discharge end.

Each of the plurality of chain links 28 comprising both the endless chains 22 and 24 are provided with a tapered protuberance 52 which projects radially outwardly from the chain links 28. As illustrated in FIGS. 2 and 3, rotation of the endless chains 22 and 24 brings the protuberance 52 into meshing engagement with the rollers 13 of the adjacent pallets 12. As illustrated in FIG. 2, the meshing of the protuberance 52 with the rollers 13 displaces adjacent pallets 12 from abutting relation of the lower reach 18. Continued rotation of the protuberance 52 engaged between the rollers 13 transfers adjacent pallets 12 singly in spaced relation in the guide tracks 16 from the lower reach 18 to the upper reach 17. The rollers 13 are adapted to travel along the arcuate surface of the protuberance 52.

When a pallet 12 has been transferred from the lower reach 18 to the upper reach 17, the rotating protuberance 52 moves out of meshing engagement with the rollers 13. Adjacent pallets return to abutting relation on the upper reach 17 thus forming a continuous pallet bed thereon. As each pallet 12 is released from engagement with the chain 22 and contacts the preceding pallet, it propels all the preceding pallets forwardly in a horizontal direction on the upper reach 17 toward the discharge end 20. Succeeding pallets accomplish the same function to thereby maintain continuous propulsion of the pallets 12 on the rails 16 from the feed end 19 to the discharge end 20. Furthermore, spacing adjacent pallets 12 at a desired interval by the engagement of the protuberance 52 with the pallet rollers 13 delivers the pallets 12 at the feed end 19 to receive a predetermined volume of granular particles discharged from the feed drum. Each pallet 12 is filled to the same level for transporting a continuous bed of granular particles from the feed end 19 to the discharge end 20 in the direction indicated by the arrow.

As illustrated in FIGS. 1 and 3, the continuous chain of pallets 12 on the upper reach 17 of the pallet rails 14 is broken at the discharge end 20 by the protuberance 52 of each chain link 28 comprising chain 24 moving into meshing relation with the pallet rollers 13. As the protuberance 52 meshes with the rollers 13 of adjacent pallets at the discharge end 20, the pallets are separated and maintained in spaced relation as indicated by the gap 54 in FIG. 3. The guide tracks 16 maintain the spaced pallets 12 engaged to the chain 24 as it revolves around the support shaft 26. The chain 24, drivingly connected to chain 22 through the pallets 12, rotates at the same preselected angular velocity thereof. As the chain 24 revolves around the support shaft 26, the pallets 12 engaged to the chain links 28 are transferred from the upper reach 17 to lower reach 18 at the discharge end 20. Thus the contents of the pallets 12 are discharged at a uniform volumetric rate.

The protuberances 52 move out of meshing relation with the pallet rollers 13 as the pallets 12, supported by the guide tracks 16, move horizontally on the lower reach 18; while, the chain 24 continues to revolve in a circular path around the support shaft 26. Thus adjacent pallets 12 are restored to abutting relation on the lower reach 18. Similarly, as described hereinabove, the pallets 12 released from engagement with the chain 26 are restored to abutting contact with the preceding pallets. As each pallet 12 is successively released from engagement with the chain 24, it propels the preceding pallets forwardly supported by the guide tracks 16 toward the feed end 19. An unbroken chain of pallets 12 is thereby continuously propelled on the lower reach 18 to the feed end 19 for transfer to the upper reach 17.

Figure 4:
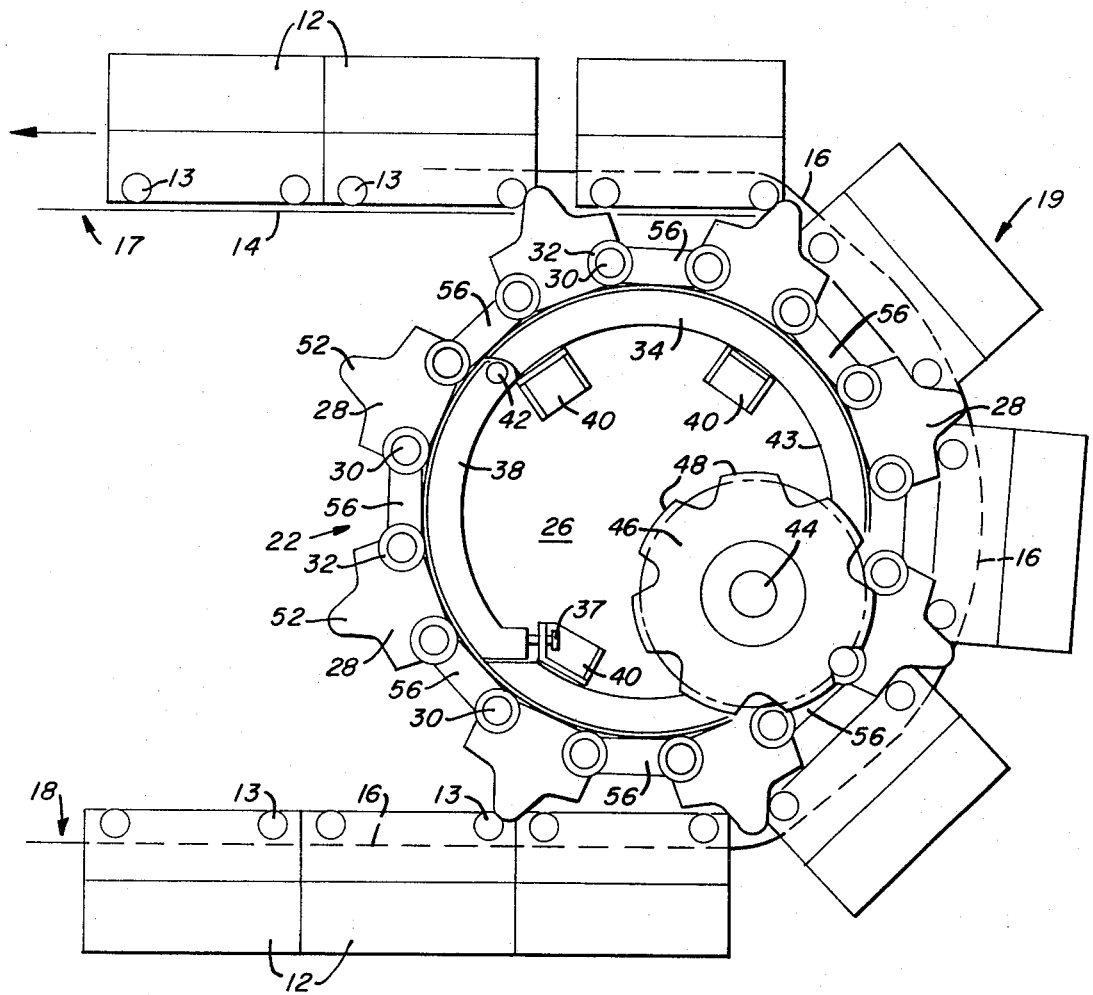
FIG. 4 is an enlarged fragmentary view of another embodiment of the endless chain provided at the feed end according to the invention.
Figure 5:
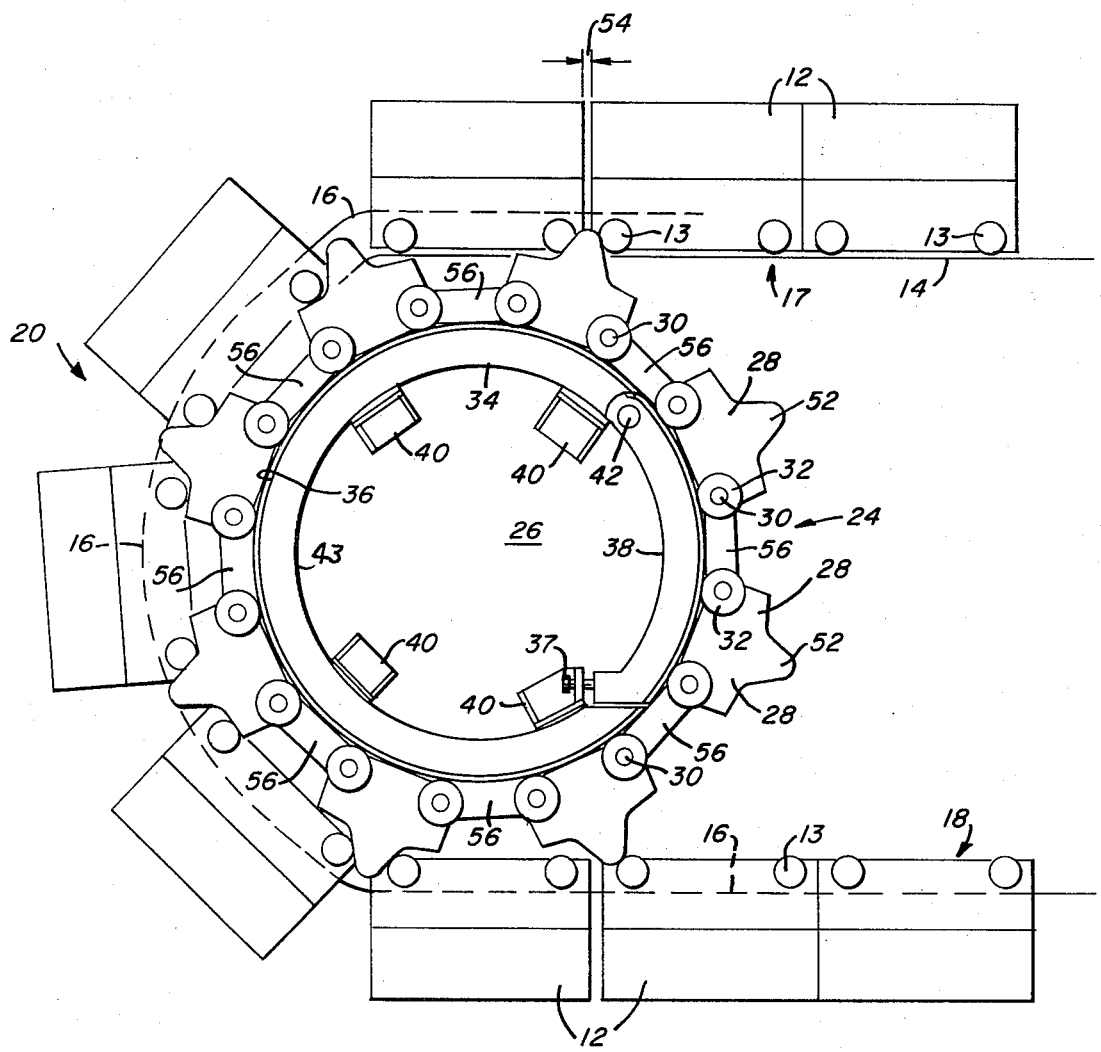
FIG. 5 is a view similar to FIG. 4 illustrating the endless chain provided at the discharge end according to the invention.

Referring to FIGS. 4 and 5, there is illustrated another embodiment of the present invention in which a substantial number of parts are the same as those illustrated in FIGS. 1 thru 3, and similar numerals will be used to designate similar parts. The endless chains 22 and 24 are positioned on the support shafts 26 at the feed end 19 and the discharge end 20 respectively. The endless chains 22 and 24 are provided with intermediate links 56 which are secured by the link rods 30 to the chain links 28. The link rollers 32, coaxially aligned with the link rods 30, rotate within the circumferential track 36 of the support ring 34 as the endless chain 22 and 24 rotate around the support shafts 26. The articulation between the intermediate links 56 and the chain links 28 assures positive contact of the link rollers 32 in the track 36 so that the teeth 48 of the sprocket 46 engage the link rods 30.

The teeth 48 engaged to the link rods 30 transmit the rotational movement of the sprocket 46 to the endless chain 22. As hereinabove described, a drive train of pallets 12 connects the endless chains 22 and 24 so that rotation is transferred at the same peripheral velocity from the endless chain 22 driven by the sprocket 46 to the endless chain 24 at the discharge end 20. Upon rotation of the chain links 28 at a preselected angular velocity around the support shafts 26, each of the protuberances 52 mesh with the rollers 13 of adjacent pallets 12. Accordingly, the engagement of the pallet rollers 13 with the protuberances 52 transfers the pallets 12 at the feed end 19 from the lower reach 18 to the upper reach 17 and at the discharge end 20 from the upper reach 17 to the lower reach 18.

According to the provisions of the patent statutes, I have explained the principle, preferred construction, and mode of operation of my invention, and have illustrated and described what I now consider to represent its best embodiments. However, it should be understood that, within the scope of the appended claims, the invention may be practiced otherwise than as specifically illustrated and described.

I claim:

1. Apparatus for transferring a plurality of pallets between the upper and lower reaches of an endless conveyor comprising, first endless engaging means for transferring each of said pallets from said lower reach to said upper reach, second endless engaging means for transferring each of said pallets from said upper reach to said lower reach, said second endless engaging means positioned remote of said first endless engaging means, support means at each end of said endless conveyor for maintaining said first and second endless engaging means aligned with said upper and lower reaches at opposite ends of said endless conveyor to thereby provide transfer of said plurality of pallets between said upper and lower reaches, said support means including a support member, a ring member mounted on said support member, fastening means for maintaining said ring member engaged to said support member, said ring member having a circumferential track extending around the outer periphery, said first and second endless engaging means arranged to revolve around said ring member in said circumferential track and, drive means for imparting rotational movement to one of said endless engaging means at a preselected angular velocity.

2. Apparatus as set forth in claim 1 in which said first and second endless engaging means includes, a plurality of articulated link members suitably connected to form an endless chain reeved about said support means, each of said link members arranged on the surface of said support means to revolve therearound, each of said link members having a tapered protuberance which projects radially outwardly therefrom, said tapered protuberance arranged to engage in meshing relation with rollers of adjacent pallets as the plurality of link members revolve around said support means so that said pallets are propelled continuously on said upper and lower reaches of said conveyor system.

3. Apparatus as set forth in claim 2 in which at least one of said endless engaging means includes, a pin member positioned intermediate of each said link members and arranged to project horizontally outwardly therefrom, said drive means operable to engage said pin member and thereby impart rotational movement to said link member so that one of said endless engaging means revolves around said support means at said preselected angular velocity.

4. Apparatus as set forth in claim 1 in which said first and second endless engaging means includes, a plurality of articulated link members arranged to form an endless chain reeved about said support means, a plurality of link rods provided to engage each of said link members to adjacent link members to thereby form an endless chain reeved about said support means, each of said link rods positioned to engage said link members at opposite ends thereof adjacent said support means, a plurality of rollers positioned for rotational movement on the surface of said support means, each of said rollers axially mounted to a corresponding link rod so that said plurality of articulated link members are arranged to revolve around said support means in an endless chain.

5. Apparatus as set forth in claim 1 which includes, guide means for securing said pallets to said lower reach for horizontal movement thereon, said guide means arranged on said endless conveyor to maintain said pallets in spaced relation relative one another as said pallets are being transferred between said upper and lower reaches.

6. Apparatus as set forth in claim 1 in which said fastening means includes, a ring segment suitably connected to said ring member and forming a portion thereof, a plurality of ring retaining members secured to said support member, each of said ring retaining members arranged in abutting contact with said inner edge of said ring member, set screw means for threadably engaging said ring segment to at least one of said ring retaining members, said set screw means operable to permit positioning of said ring segment relative said ring member so that said endless chain is arranged for rotation around said support member.

7. Apparatus as set forth in claim 1 in which said drive means for imparting rotational movement to at least one of said endless engaging means at a preselected angular velocity includes, a drive shaft rotatably supported adjacent said support means for rotation at a preselected angular velocity, drive sprocket means nonrotatably supported on said drive shaft for transferring rotational movement at a preselected angular velocity from said drive shaft to said endless engaging means, said drive sprocket means having a plurality of teeth provided thereon, said teeth arranged to engage and disengage at least one of said endless engaging means to thereby impart rotational movement thereto at a preselected angular velocity.

8. Apparatus as set forth in claim 1 in which said first and second endless engaging means includes, a plurality of articulated link members arranged for rotational movement around said support means, a pluraltiy of intermediate link members positioned between each of said articulated link members, a plurality of link rods provided to engage said intermediate link members to said articulated link members to thereby form an endless chain reeved about said support means, a plurality of rollers positioned on the surface of said support means for rotational movement thereon, each of said rollers axially mounted to a corresponding link rod so that each of said articulated link members together with each of said intermediate link members revolve around said support means in an endless chain at a preselected angular velocity.

9. Apparatus as set forth in claim 1 which includes, said first endless engaging means operable to provide continuous propulsion of said plurality of pallets on said upper reach of said conveyor system, said second endless engaging means operable to provide continuous propulsion of said plurality of pallets on said lower reach of said conveyor system, said first and second endless engaging means operable in combination to provide continuous propulsion of said plurality of pallets on said upper and lower reaches of said conveyor system.

* * * * *